(No Model.)

G. C. PHILLIPS.
MANUFACTURE OF THE BODIES OF STENCH TRAPS.

No. 389,761. Patented Sept. 18, 1888.

Witnesses.

Inventor
George C. Phillips.
by Singleton & Piper, att'ys

UNITED STATES PATENT OFFICE.

GEORGE C. PHILLIPS, OF PROVIDENCE, RHODE ISLAND.

MANUFACTURE OF THE BODIES OF STENCH-TRAPS.

SPECIFICATION forming part of Letters Patent No. 389,761, dated September 18, 1888.

Application filed May 19, 1888. Serial No. 274,376. (No model.)

*To all whom it may concern:*

Be it known that I, GEORGE C. PHILLIPS, a citizen of the United States, residing at Providence, in the county of Providence and State of Rhode Island, have invented certain new and useful Improvements in the Manufacture of the Bodies of Sanitary or Stench Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
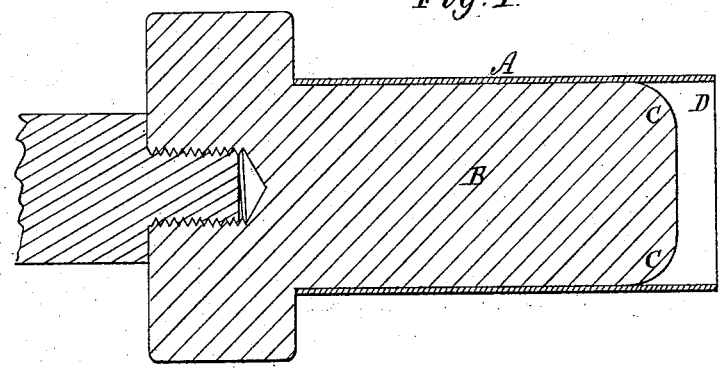
Figure 2:
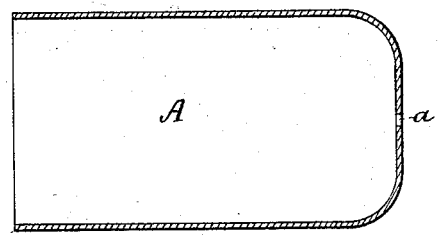
Figure 3:
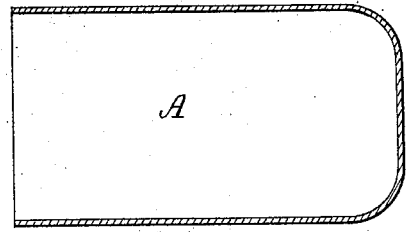

Figure 1 is a longitudinal section of a piece of lead pipe as it appears when applied to a chuck and before being subjected to the process hereinafter described. Fig. 2 is a longitudinal section of said piece of pipe as it appears after one of its ends has been nearly closed by said process, and Fig. 3 is a longitudinal section of said pipe, showing said end as entirely closed.

My invention consists in forming a sanitary or stench trap body of a piece of lead pipe by closing the end which is to form the bottom or an end of said trap in such manner and by the process hereinafter set forth as will render said end practically solid and seamless.

In carrying out my invention I take a piece, A, of lead pipe, (see Fig. 1,) cut to the proper or desired length, and place it on a chuck, B, which is secured to the arbor of a lathe, the outer end of the chuck being formed as shown at C or to the shape which it is desired to give to the bottom or closed end of the trap. The lathe being put in motion, the outer end, D, of the pipe can, while in revolution and by means of a proper tool supported on a rest and guided by the hands of a workman, be closed in to such an extent as to leave but a small opening, *a*, in said end, as shown in Fig. 2. Next the metal immediately surrounding the said opening is to be subjected to the action of a flame or to heat of sufficient intensity to fuse the metal and thereby close the said opening, and thus render the metal of said end of the pipe practically solid and seamless.

The advantages resulting from making a trap-body in the manner hereinbefore set forth are that the metal of the pipe of which it is formed, having been subjected in the process of its manufacture to great pressure, is consequently more dense or solid than the metal of a trap-body made of lead cast into shape in a mold, and therefore is a superior article; and, furthermore, a trap-body can be manufactured from a piece of pipe in the manner hereinbefore described at much less cost than can a body cast in a mold.

Therefore what I claim as of my invention is—

The process of forming sanitary or stench traps which consists in placing a piece of pipe upon a lathe-chuck, turning down the projecting end of the piece of pipe, and heating to fuse the metal, and then closing up the turned-down end thus formed, as set forth.

In testimony whereof I affix my signature in presence of two witnesses.

GEORGE C. PHILLIPS.

Witnesses:
WILLIAM H. SWEETLAND,
LORIN M. COOK.